(12) United States Patent
Kantany et al.

(10) Patent No.: US 10,801,412 B2
(45) Date of Patent: Oct. 13, 2020

(54) PRESSURE ZONE SPRAYBARS

(71) Applicant: UNITED TECHNOLOGIES CORPORATION, Farmington, CT (US)

(72) Inventors: Nicholas W Kantany, Manchester, CT (US); Christopher K Weakley, Canton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 336 days.

(21) Appl. No.: 15/851,374

(22) Filed: Dec. 21, 2017

(65) Prior Publication Data

US 2019/0195134 A1 Jun. 27, 2019

(51) Int. Cl.
*F02C 7/232* (2006.01)
*F02K 3/10* (2006.01)
*F02C 7/22* (2006.01)
*F02K 3/08* (2006.01)

(52) U.S. Cl.
CPC .............. *F02C 7/232* (2013.01); *F02C 7/222* (2013.01); *F02K 3/08* (2013.01); *F02K 3/10* (2013.01)

(58) Field of Classification Search
CPC ..... F02K 3/10; F02K 3/08; F02K 3/11; F02K 3/105; F02C 7/22; F02C 7/222; F02C 7/232; F23R 3/28; F23R 3/34; F23R 3/36
See application file for complete search history.

(56) References Cited

U.S. PATENT DOCUMENTS

| | | | | | |
|---|---|---|---|---|---|
| 2,617,478 A | * | 11/1952 | Hildestad | ................... | F02C 7/22 239/443 |
| 2,993,338 A | * | 7/1961 | Wilsted | ...................... | F23R 3/28 60/739 |
| 3,698,186 A | * | 10/1972 | Beane | ........................ | F23R 3/00 60/746 |
| 4,751,815 A | * | 6/1988 | Moore | ...................... | F23R 3/32 60/738 |
| 5,303,542 A | * | 4/1994 | Hoffa | ......................... | F23R 3/26 60/746 |
| 6,668,541 B2 | | 12/2003 | Rice et al. | | |
| 7,036,302 B2 | * | 5/2006 | Myers, Jr. | ................ | F23R 3/343 60/39.281 |
| 8,234,873 B2 | | 8/2012 | Houtman et al. | | |
| 8,573,245 B1 | * | 11/2013 | Jansen | ..................... | F02C 7/232 137/240 |
| 2010/0263755 A1 | * | 10/2010 | Taylor | ...................... | F02C 7/232 137/613 |
| 2012/0260663 A1 | * | 10/2012 | Pidcock | ................... | F02C 7/222 60/772 |
| 2014/0338357 A1 | * | 11/2014 | Lovett | ........................ | F02C 7/22 60/776 |

* cited by examiner

*Primary Examiner* — William H Rodriguez
*Assistant Examiner* — David P. Olynick
(74) *Attorney, Agent, or Firm* — Snell & Wilmer L.L.P.

(57) ABSTRACT

A pressure zoned spraybar for an augmentor section of a gas turbine engine may comprise a fuel conduit and a pressure valve in fluid communication with the fuel conduit. A fuel nozzle may be downstream of the pressure valve. The pressure valve may be configured to regulate a flow of fluid to the fuel nozzle.

20 Claims, 6 Drawing Sheets

PRESSURE ZONE SPRAYBARS

STATEMENT OF GOVERNMENT INTEREST

This disclosure was made with government support under Contract No. FA8626-16-C-2139 awarded by the United States Air Force. The government has certain rights in the disclosure.

FIELD

The present disclosure relates to gas turbine engines, and, more specifically, to pressure zoned spraybars.

BACKGROUND

A gas turbine engine typically includes a fan section, a compressor section, a combustor section, and a turbine section. In general, during operation, air is pressurized in the fan and compressor sections and is mixed with fuel and burned in the combustor section to generate hot combustion gases. The hot combustion gases flow through the turbine section, which extracts energy from the hot combustion gases to power the compressor section and other gas turbine engine loads. Downstream of the turbine section, an augmentor section, or "afterburner," is operable to selectively increase the thrust. The increase in thrust is produced when fuel is injected into the core exhaust gases downstream of the turbine section and burned with the oxygen contained therein to generate a second combustion. Current augmentor systems may include multiple fueling areas with each fueling area having its own on/off control and dedicated tubing.

SUMMARY

A spraybar for an augmentor section of a gas turbine engine is described herein, in accordance with various embodiments. The spraybar may comprise a fuel conduit, a first pressure valve in fluid communication with the fuel conduit, and a first fuel nozzle downstream of the first pressure valve.

In various embodiments, the first pressure valve may comprise a valve cap and a spring configured to exert a force on the valve cap. The first pressure valve may be an in-line biased pressure valve. In various embodiments, the first pressure valve may be an orthogonally biased pressure valve.

In various embodiments, a second pressure valve may be in fluid communication with the fuel conduit. The second pressure valve may be radially outward of the first pressure valve. A second fuel nozzle may be downstream of the second pressure valve. A first connecting conduit may fluidly couple the first fuel nozzle and the fuel conduit. A second connecting conduit may fluidly couple the second fuel nozzle and the fuel conduit. In various embodiments, a pressure associated with opening the second pressure valve may be less than a pressure associated with opening the first pressure valve.

A gas turbine engine is also provided herein, in accordance with various embodiments. The gas turbine engine may comprise a turbine and an augmentor section aft of the turbine. The augmentor section may comprise an augmentor vane. A spraybar may be located proximate an aft end of the augmentor vane. The spraybar may comprise a fuel conduit, a first pressure valve in fluid communication with the fuel conduit, and a first fuel nozzle downstream of the first pressure valve.

In various embodiments, the first pressure valve may comprise a valve cap and a spring configured to exert a force on the valve cap. The first pressure valve may be an in-line biased pressure valve. In various embodiments, the first pressure valve may be an orthogonally biased pressure valve.

In various embodiments, a second pressure valve may be in fluid communication with the fuel conduit. The second pressure valve may be radially outward of the first pressure valve. A second fuel nozzle may be downstream of the second pressure valve. A pressure associated with opening the second pressure valve may be less than a pressure associated with opening the first pressure valve.

An augmentor fuel injection system is also provided here, in accordance with various embodiments. The augmentor fuel injection system may comprise a fuel manifold, a fuel conduit extending radially from the fuel manifold, a first pressure valve in fluid communication with the fuel conduit, and a first fuel nozzle downstream of the first pressure valve.

In various embodiments, a flow control valve may be upstream of the first pressure valve. The flow control valve may be configured to regulate a flow of fluid to the fuel conduit. In various embodiments, the first pressure valve may comprise a valve cap and a spring configured to exert a force on the valve cap. The first pressure valve may be at least one of an in-line biased pressure valve or an orthogonally biased pressure valve.

In various embodiments, a second pressure valve may be in fluid communication with the fuel conduit. The second pressure valve may be a greater distance radially from the fuel manifold than the first pressure valve. A second fuel nozzle may be downstream from the second pressure valve. In various embodiments, a pressure associated with opening the second pressure valve may be greater than a pressure associated with opening the first pressure valve. In various embodiments, a first connecting conduit may fluidly couple the first fuel nozzle and the fuel conduit. A second connecting conduit may fluidly couple the second fuel nozzle and the fuel conduit. A pressure associated with opening the second pressure valve may be less than a pressure associated with opening the first pressure valve.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

As used herein, "aft" refers to the direction associated with the tail (e.g., the back end) of an aircraft, or generally, to the direction of exhaust of a gas turbine engine. As used herein, "forward" refers to the direction associated with the intake (e.g., the front end) of a gas turbine engine. The term "upstream" is used to refer to directions and positions located closer to the source than directions and positions referenced as "downstream."

As used herein, "distal" refers to the direction outward, or generally, away from a reference component. As used herein, "proximate" refers to a direction inward, or generally, towards a reference component. A first component that is "radially outward" of a second component means that the first component is positioned at a greater distance away from a central longitudinal axis of the gas turbine engine. A first component that is "radially inward" of a second component means that the first component is positioned closer to the engine central longitudinal axis than the second component. The terminology "radially outward" and "radially inward" may also be used relative to references other than the engine central longitudinal axis.

Figure 1:
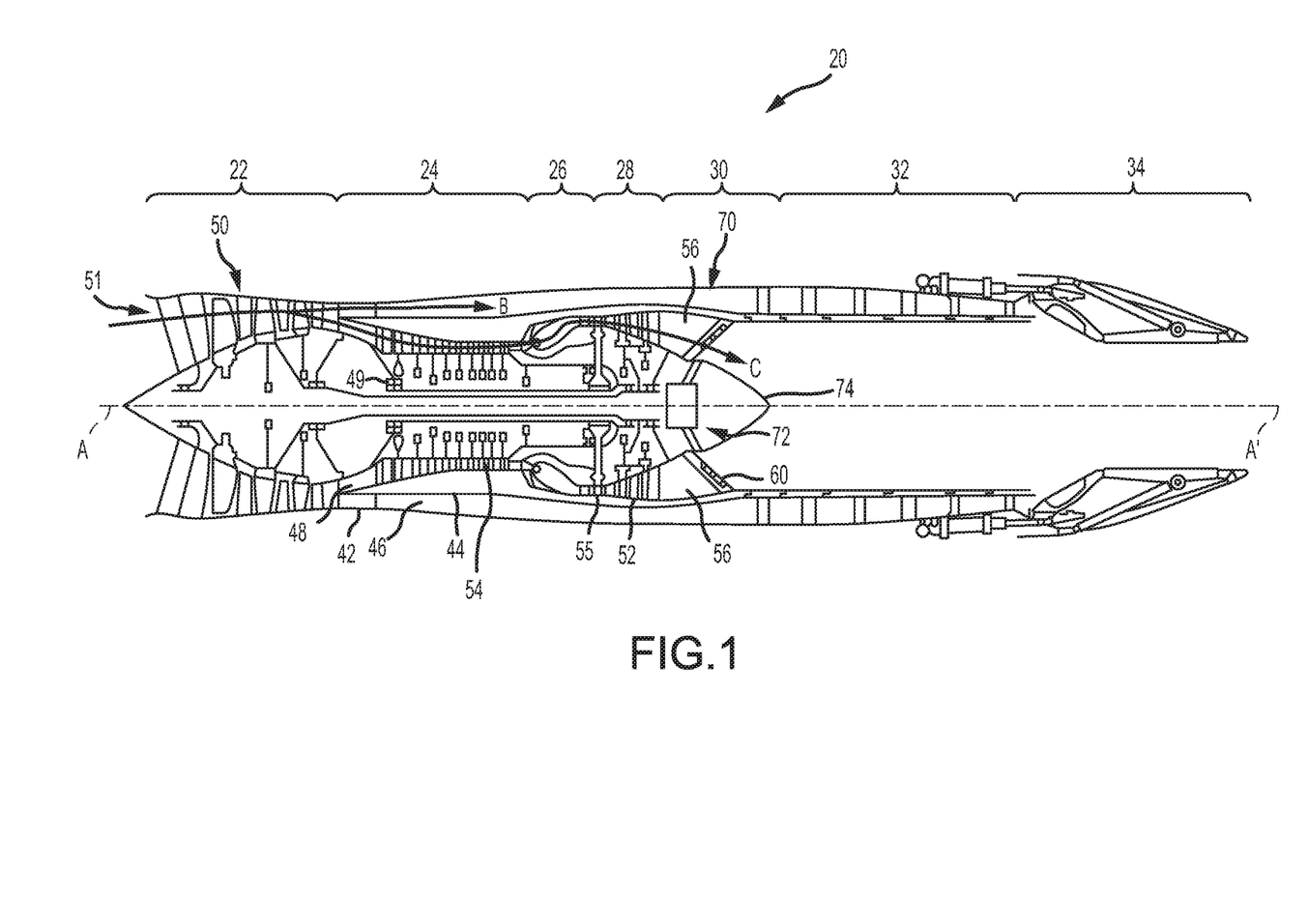
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may comprise a two-spool low-bypass augmented turbofan that may generally incorporate a fan section 22, a compressor section 24, a combustor section 26, a turbine section 28, an augmentor section 30, an exhaust duct section 32, and a nozzle system 34. Fan section 22, a compressor section 24, a combustor section 26, a turbine section 28, an augmentor section 30, an exhaust duct section 32, and a nozzle system 34 are along an engine central longitudinal axis A-A'. Engine central longitudinal axis A-A' is oriented in the z direction on the provided xyz axis. Although depicted as an augmented low-bypass turbofan in the non-limiting embodiment of FIG. 1, it should be understood that the concepts described herein are applicable to other gas turbine engines including geared architecture engines, direct drive turbofans, high-bypass turbofans, turbojets, turboshafts, and other engine architectures. A gas turbine engine may comprise an industrial gas turbine (IGT) or a geared engine, such as a geared turbofan, or a non-geared engine, such as a turbofan, or may comprise any gas turbine engine as desired.

The compressor section 24, the combustor section 26, and the turbine section 28 are generally referred to as the engine core. An outer engine case structure 42 and an inner engine structure 44 define a generally annular bypass airflow path (or bypass duct) 46 around a core airflow path 48 of the engine core. It should be understood that various structures within the engine may define the outer engine case structure 42 and the inner engine structure 44, which generally define an exoskeleton to support the core engine therein.

Air is drawn into gas turbine engine 20 through a fan 50. Air may enter fan 50 at intake 51 and may be divided downstream between a core airflow C, which flows through core airflow path 48, and a bypass airflow B, which flows through bypass airflow path 46. Compressor section 24 may be located downstream of fan section 22. Core airflow C passes through compressor section 24, combustor section 26, turbine section 28, and augmentor section 30. In augmentor section 30, fuel may be selectively injected and burned to generate additional thrust through the nozzle system 34. Bypass airflow B may be utilized for multiple purposes including, for example, cooling and pressurization. Bypass airflow B may ultimately be at least partially injected into core airflow path 48 adjacent to the augmentor section 30 and/or the exhaust duct section 32 and/or the nozzle system 34.

Gas turbine engine 20 may generally comprise a low speed spool and a high speed spool mounted concentrically via bearing systems 49 for rotation about engine central longitudinal axis A-A'. It should be understood that various bearing systems 49 at various locations may alternatively or additionally be provided. In various embodiments, fan section 22, compressor section 24, and turbine section 28 may each include a rotor-stator assembly comprising one or more stages or sets of rotating blades ("rotor blades") and one or more stages or sets of stationary vanes ("stator vanes") axially interspersed with the associated blade stages but non-rotating about engine central longitudinal axis A-A'. Unless otherwise indicated, the term "stage" may refer to a fan stage, a compressor stage, and/or a turbine stage. The blade stages of fan 50 and a low pressure turbine 52 may at least partially form a low speed spool. Similarly, the blade stages of a high pressure compressor 54 and high pressure turbine 55 may at least partially form a high speed spool. Alternative implementations may include a low pressure compressor driven by low pressure turbine as part of the low speed spool. As used herein, a "high pressure" compressor or turbine experiences a higher pressure than a corresponding "low pressure" compressor or turbine.

Augmentor section 30 may reside aft of the turbine section 28 and may be available to provide additional power. Augmentor section 30 may be positioned forward of exhaust duct section 32 to receive the hot exhaust gases as they exit turbine section 28. At the aft end of exhaust duct section 32 is nozzle system 34, which may be a convergent-divergent (C-D) nozzle. Hot gases passing through nozzle system 34 may provide thrust to move the aircraft forward.

Figure 2:
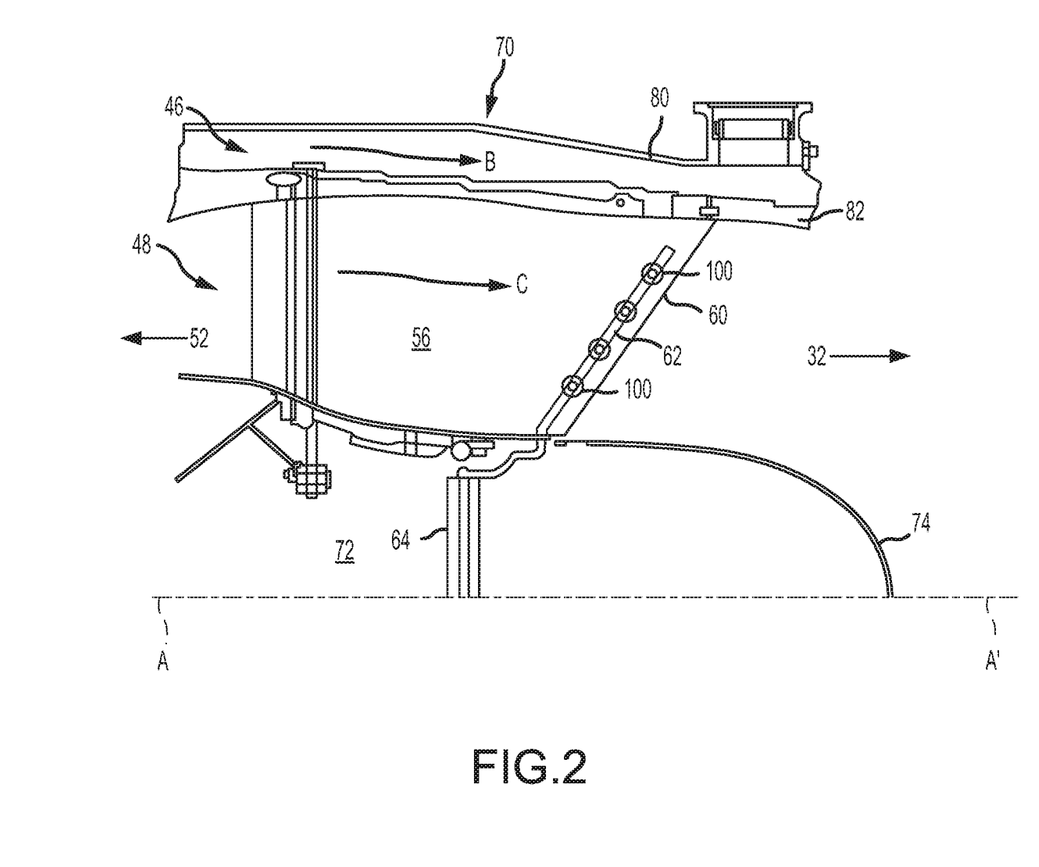
FIG. 2 illustrates a cross-sectional view of an augmentor vane in an augmentor section of a gas turbine engine, in accordance with various embodiments.

With reference to FIG. 2, in various embodiments, augmentor section 30 may comprise a turbine exhaust case (TEC) 70 and a center body 72 with a conically shaped tail cone 74. TEC 70 may comprise an outer case 80 and a concentrically spaced inner liner 82. Outer case 80 may form a portion of outer engine case structure 42, with monetary reference to FIG. 1. Inner liner 82 may be located radially inward of outer case 80, and may operate as a heat shield to protect outer case 80 from the exhaust gas flow (e.g., core airflow C) in core airflow path 48. A portion of bypass airflow path 46 may be defined in part by outer case 80 and inner liner 82. In various embodiments, air discharged from, for example, the fan section 22 may be communicated through the bypass airflow path 46.

Augmentor section 30 may further comprise a plurality of circumferentially arrayed augmentor vanes 56. Augmentor vanes 56 may extend generally radially between center body 72 and inner liner 82. In various embodiments, bypass airflow B may be received from the bypass airflow path 46 to cool and pressurize augmentor vanes 56. In various embodiments, augmentor vanes 56 may include one or more spraybar(s) 62. Spraybars 62 may be located proximate an aft end 60 of augmentor vanes 56.

Figure 3:
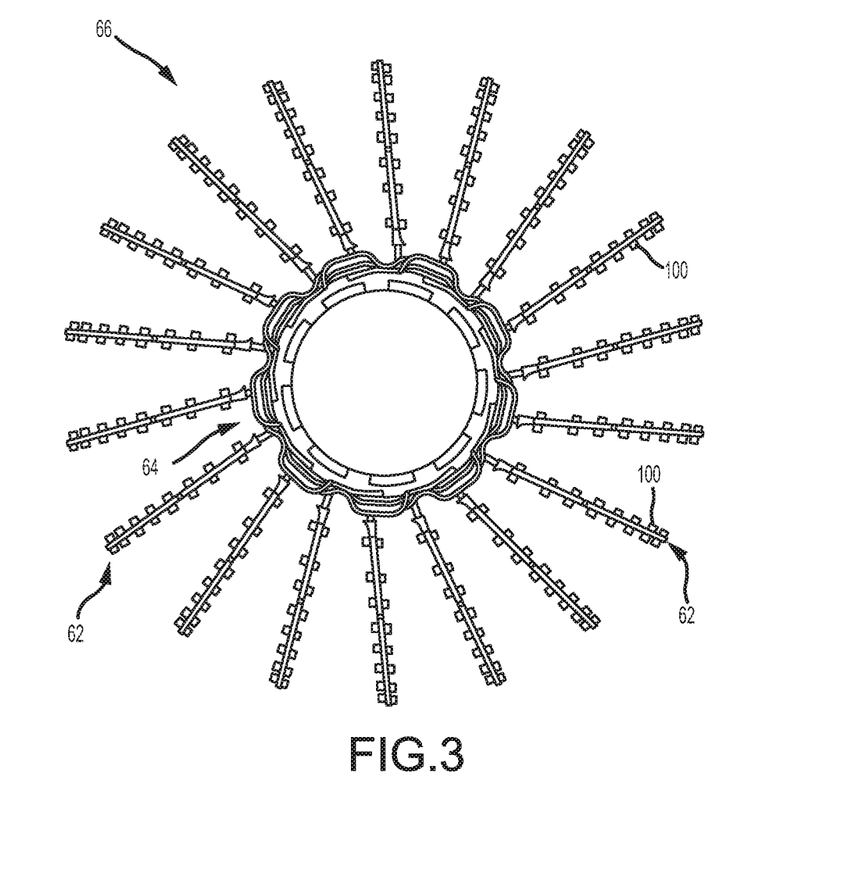
FIG. 3 illustrates aftward looking view of an augmentor fuel injection system, in accordance with various embodiments.

With combined reference to FIG. 2 and FIG. 3, spraybars 62 may extend from a fuel manifold 64 of an augmentor fuel injection system 66. Fuel manifold 64 may be located radially inboard such that the spraybars 62 extend radially outward from fuel manifold 64, as shown in FIG. 3. In various embodiments, the fuel manifold may be placed radially outboard such that the spraybars extend radially inward from the fuel manifold. Multiple fuel nozzles 100 are spaced along each spraybar 62. Fuel nozzles 100 spray fuel into the exhaust gas stream downstream of the turbine section 28 (FIG. 1), which may be mixed with oxygen and ignited to generate a second combustion and increased thrust. An igniter or pilot system may be operated to ignite and maintain ignition of the fuel sprayed from spraybars 62.

Figure 4A:
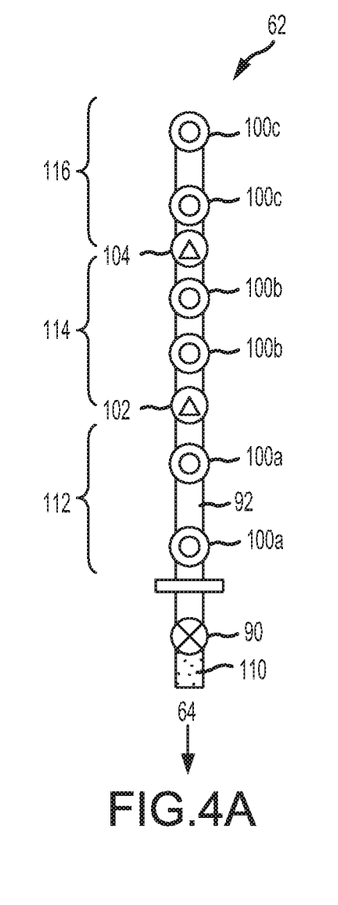
FIGS. 4A, 4B, 4C, and 4D illustrate a zoned spraybar with in-line fuel nozzles, in accordance with various embodiments.
Figure 4B:
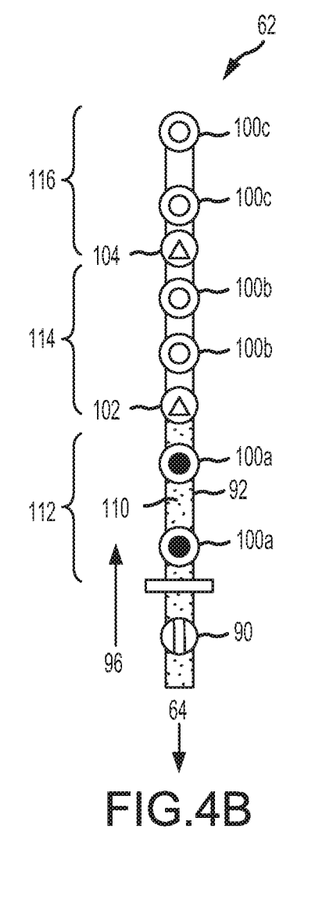
Figure 4C:
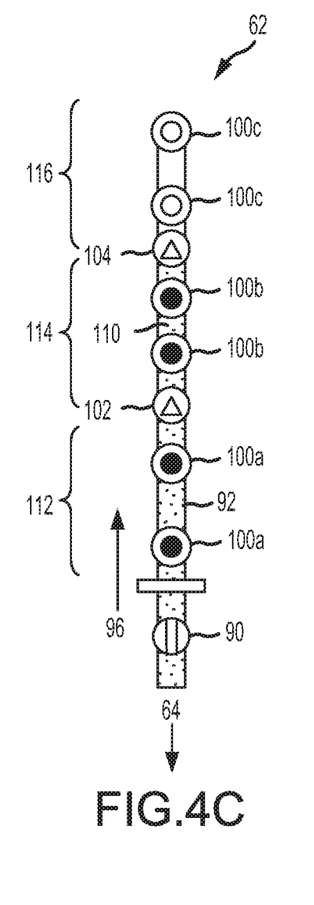
Figure 4D:
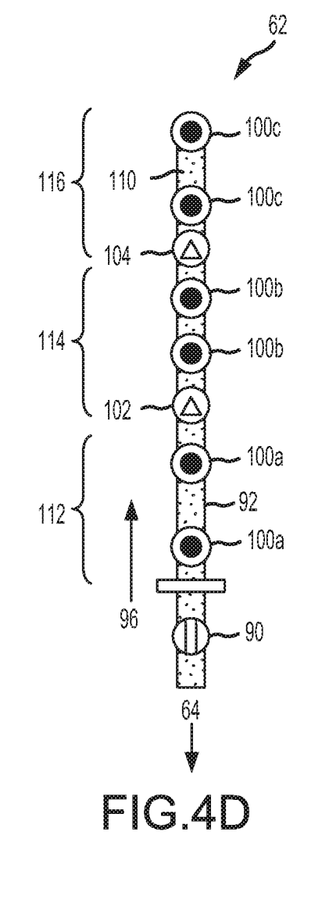

With reference to FIGS. 4A, 4B, 4C, and 4D, a pressure zoned spraybar with in-line fuel nozzles is illustrated, in accordance with various embodiments. Spraybar 62 may comprise a fuel conduit 92 having a flow control (e.g., on/off) valve 90 located on one end of fuel conduit 92. In various embodiments, flow control valve 90 may be located on the end of fuel conduit 92 that is proximate fuel manifold 64. Fuel conduit 92 may be in fluid communication with fuel manifold 64. Flow control valve 90 may be configured to control the flow of fluid 110 (e.g., fuel) into fuel conduit 92. For example, when flow control valve 90 is in an "open" position, as shown in FIGS. 4B, 4C, and 4D, fluid 110 may enter (i.e., flow into) fuel conduit 92. When flow control valve 90 is in a "closed" position, as shown in FIG. 4A, fluid 110 may be prevented from entering (i.e., flowing into) fuel conduit 92. Fluid 110 may flow through fuel conduit 92 in a direction generally away from fuel manifold 64. Stated differently, fluid 110 may flow through fuel conduit 92 in the direction of arrow 96.

Spraybar 62 may comprise a plurality of fuel nozzles (e.g., fuel nozzles 100a, 100b, and 100c). Fuel nozzles 100a, 100b, and 100c may be fluidly coupled to fuel conduit 92. Spraybar 62 may further comprise one or more pressure valves (e.g., pressure valves 102 and 104) fluidly coupled to fuel conduit 92 and configured to regulate the flow of fluid 110 to fuel nozzles 100a, 100b, and 100c. For example, in various embodiments, a pressure valve 102 may be located between fuel nozzles 100a and 100b, and a pressure valve 104 may located between fuel nozzles 100b and 100c.

Pressure valves 102 and 104 may by in fluid communication with fuel conduit 92, and may be configured to regulate fluid flow through fuel conduit 92, thereby providing a multi-zone spraybar. For example, spraybar 62 may comprise a zone 112 downstream of flow control valve 90 and upstream of pressure valve 102, a zone 114 downstream of pressure valve 102 and upstream of pressure valve 104, and a zone 116 downstream of pressure valve 104. In various embodiments, pressure valve 102 may be configured to open at a pressure different from pressure valve 104. For example, with reference to FIG. 4B, upon opening flow control valve 90, fluid 110 may flow into zone 112 of spraybar 62. A portion of the fluid 110 in zone 112 may be ejected from fuel nozzles 100a. When flow control valve 90 is initially opened, pressure valves 102 and 104 may be in a closed position and may prevent fluid 110 from flowing into zones 114 and 116, respectively. Stated differently, while a pressure in zone 112 remains below a threshold pressure associated with opening pressure valve 102, fluid 110 is prevented (i.e., blocked) from flowing to fuel nozzles 100b and 100c.

With reference to FIG. 4C, as a volume of fluid 110 in zone 112 and/or as a rate of fluid flow into fuel conduit 92 increases, the pressure within zone 112 may increase. In this regard, when the pressure in zone 112 (i.e., upstream of pressure valve 102) exceeds the pressure threshold associated with the opening of pressure valve 102, pressure valve 102 may translate to an open position.

Figure 6A:
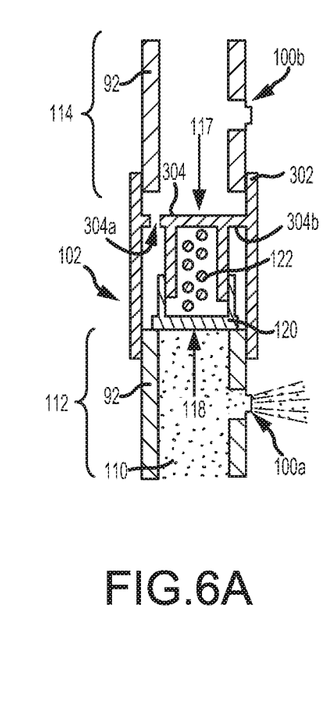
FIGS. 6A and 6B illustrate an in-line biased pressure valve for a zoned spraybar, in accordance with various embodiments.
Figure 6B:
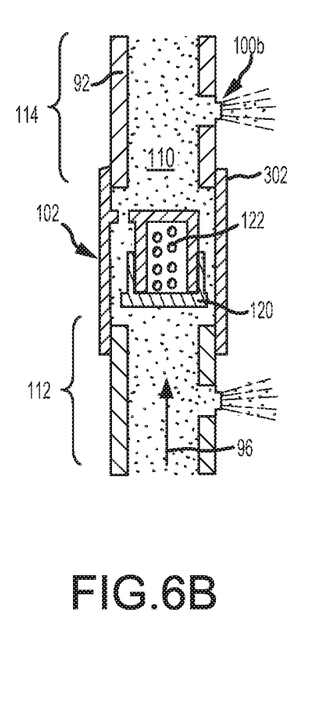

With reference to FIGS. 6A and 6B, in various embodiments, pressure valve 102 may comprise an in-line biased pressure valve 302. As used herein, "in-line biased" means that the biasing member (e.g., spring) of the pressure valve applies a force that is opposite and parallel to the general direction of fluid flow through the pressure valve. In-line biased pressure valve 302 comprises a valve cap 120 and a spring (or biasing member) 122. Spring 122 may exert a load on valve cap 120 in the direction of arrow 117 (i.e., in an upstream direction). Fluid 110 in zone 112 may exert a load on valve cap 120 in the direction of arrow 118 (i.e., in an downstream direction). Valve cap 120 may be configured to prevent fluid 110 from flowing into zone 114, when pressure valve 102 is in a closed position (FIG. 6A), and configured to allow fluid 110 to flow into zone 114, when pressure valve 102 is in an open position (FIG. 6B). For example, when the load exerted by fluid 110 exceeds the load exerted by spring 122, spring 122 may compress, valve cap 120 may translate in the direction of arrow 118, and fluid 110 may flow into zone 114. Stated differently, when the pressure within zone 112 exceeds the force exerted by spring 122, in-line biased pressure valve 302 may be forced into the open position, thereby allowing fluid 110 to reach fuel nozzles 100b. When load exerted by spring 122 exceeds the load being exerted by fluid 110, spring 122 may decompress and force valve cap 120 in the direction of arrow 117, thereby translating in-line biased pressure valve 302 to the closed position. In-line biased pressure valve 302 may comprise a spring housing 304 configured to support spring 122. Spring housing 304 is configured to permit downstream fluid 110 flow, when in-line biased pressure valve 302 is in an open position. For example, spring housing 304 may comprise apertures 304a which fluid 110 may flow through, when in-line biased pressure valve 302 is in an open position, and/or spring housing 304 may comprise bars, or spokes, 304b which fluid 110 may flow around, when in-line biased pressure valve 302 is in an open position.

Figure 7A:
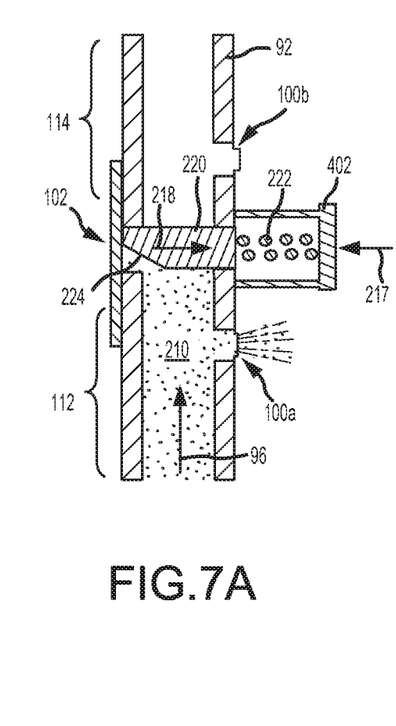
FIGS. 7A and 7B illustrate an orthogonally biased pressure valve for a zoned spraybar, in accordance with various embodiments.
Figure 7B:
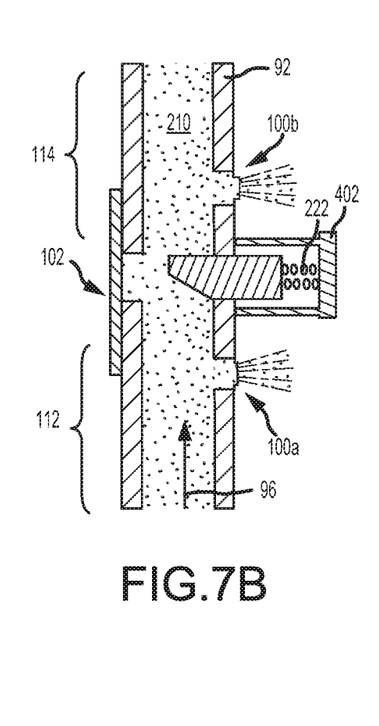

With reference to FIGS. 7A and 7B, in various embodiments, pressure valve 102 may comprise an orthogonally biased pressure valve 402. As used herein, "orthogonally biased" means that the biasing member (e.g., spring) of the pressure valve applies a force that is generally orthogonal to the direction of fluid flow through the pressure valve. As used herein, "generally orthogonal" means between ±20 degrees from orthogonal (i.e., between 70 degrees and 110 degrees). Orthogonally biased pressure valve 402 comprises a valve cap 220 and a spring (or biasing member) 222. Spring 222 may exert a load on valve cap 220 in the direction of arrow 217. The load exerted by spring 222 may be generally orthogonal to fuel conduit 92 and/or generally orthogonal to the direction of fluid flow (as indicated by arrow 96) through fuel conduit 92. Valve cap 220 may comprise an angled surface 224 oriented generally upstream or toward the fuel manifold. Angled surface 224 may allow fluid 110 to exert a load on valve cap 220 in a direction opposite the direction of the load exerted by spring 222 (i.e., fluid 110 may exert a load on valve cap 220 in the direction of arrow 218).

Valve cap 220 may be configured to prevent fluid 110 from flowing into zone 114, when orthogonally biased pressure valve 402 is in a closed position (FIG. 7A), and to allow fluid 110 to flow into zone 114, when orthogonally biased pressure valve 402 is in an open position (FIG. 7B). For example, when the load exerted by fluid 110 exceeds the load exerted by spring 222, spring 222 may compress, valve cap 220 may translate in the direction of arrow 218, and fluid 110 may flow into zone 114. Stated differently, when the pressure within zone 112 exceeds the force exerted by spring 222, orthogonally biased pressure valve 402 may be forced into the open position, thereby allowing fluid 110 to reach fuel nozzles 100b. When load exerted by spring 222 exceeds the load being exerted by fluid 110, spring 222 may decompress and force valve cap 220 in the direction of arrow 217, thereby translating orthogonally biased pressure valve 402 to the closed position. The threshold pressure associated with opening orthogonally biased pressure valve 402 may adjusted by changing the angle of angled surface 224 and/or by changing the spring constant of spring 222.

Returning to FIG. 4C, upon opening pressure valve 102, fluid 110 flows into zone 114 of spraybar 62. A portion of the fluid 110 in zone 114 may be ejected from fuel nozzles 100b. When pressure valve 102 is initially opened, pressure valve 104 may be in a closed position and may prevent fluid 110 from flowing into zone 116. Stated differently, while a pressure in zone 114 remains below a threshold pressure associated with opening pressure valve 104, fluid 110 is prevented (i.e., blocked) from flowing to fuel nozzles 100c. As a volume and/or rate of flow of fluid 110 into zone 114 increases, the pressure within zone 114 may increase.

With reference to FIG. 4D, pressure valve 104 may translate to an open position, when the pressure in zone 114 (i.e., upstream of pressure valve 104) exceeds the pressure threshold associated with the opening of pressure valve 104. In various embodiments, pressure valve 104 comprises an in-line biased pressure valve, similar to in-line biased pressure valve 302 in FIGS. 6A and 6B. In various embodiments, pressure valve 104 comprises an orthogonally biased pressure valve, similar to orthogonally biased pressure valve 402 in FIGS. 7A and 7B. In this regard, pressure valve 104 may comprise a valve cap and spring. The spring may exert a load on the valve cap in a direction opposite the direction of the load being applied to the valve cap by fluid 110. The valve cap may be configured to prevent fluid 110 from flowing into zone 116, when pressure valve 104 is in a closed position, and to allow fluid 110 to flow into zone 116, when pressure valve 104 is in an open position. For example, when the load exerted by fluid 110 exceeds the load exerted by the spring, the spring may compress and the valve cap may translate in a direction opposite the direction of the load being applied by the spring. Stated differently, when the pressure within zone 114 exceeds the force exerted by the spring, pressure valve 104 may be forced into the open position, thereby allowing fluid 110 to reach fuel nozzles 100c. When load exerted by the spring exceeds the load being exerted by fluid 110, the spring may decompress, thereby translating pressure valve 104 to the closed position.

In various embodiments, pressure valve 104 may be positioned radially outward of pressure valve 102. Stated differently, pressure valve 104 may be positioned a greater radial distance from fuel manifold 64 as compared to pressure valve 102. In various embodiments, the threshold pressure associated with opening pressure valve 104 may be different from the threshold pressure associated with opening pressure valve 102. For example, the threshold pressure associated with opening pressure valve 104 may be greater than the threshold pressure associated with opening pressure valve 102. While two pressure valves are illustrated, it should be appreciated that spraybar 62 may include any number of pressure valves. Spraybars 62 comprising one or more pressure valves may allow multiple fuel injection zones to be formed along a single fuel conduit. Employing a single fuel conduit with multiple fuel injection zones tends to improve packaging and decrease a weight of the system, as compared to augmentor fuel injection system employing multiple conduits to generate fuel zoning.

With reference to FIGS. 5A, 5B, 5C, 5D, and 5E a pressure zoned spraybar 162 with off-set fuel nozzles is illustrated, in accordance with various embodiments. Spraybar 162 may be part of an augmentor fuel injection system, similar to augmentor fuel injection system 66 of FIG. 3. Spraybar 162 may extend radially inward or radially outward from a fuel manifold 164, similar to fuel manifold 64 of FIG. 3. Multiple fuel nozzles (e.g., fuel nozzles 200a, 200b, 200c, and 200d) may be located along spraybar 162. Fuel nozzles 200a, 200b, 200c, and 200d may spray fuel into the exhaust gas stream downstream of the turbine section 28 (FIG. 1), which is mixed with oxygen and ignited to generate a second combustion and increased thrust.

Figure 5A:
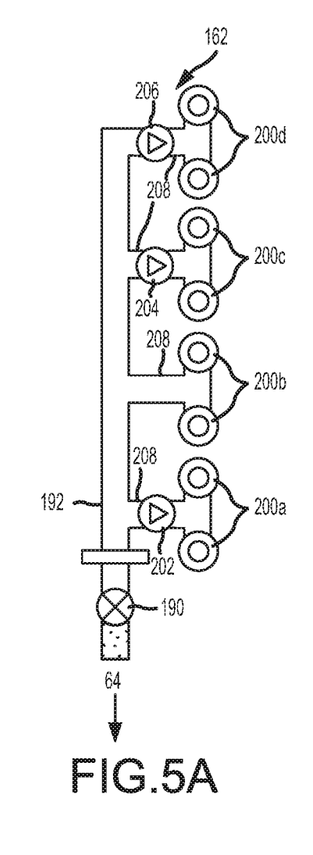
FIGS. 5A, 5B, 5C, 5D, and 5E illustrate a zoned spraybar with off-set fuel nozzles, in accordance with various embodiments.
Figure 5B:
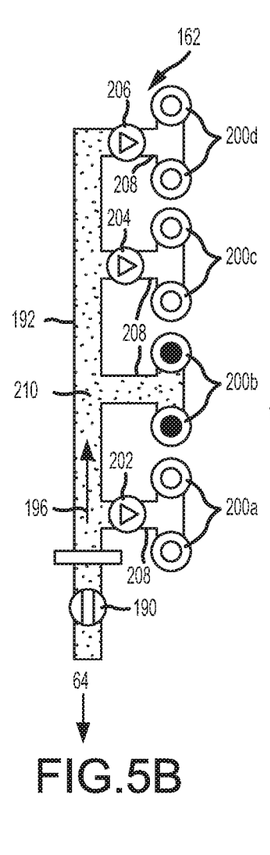

Spraybar 162 may comprise a fuel conduit 192 having a flow control (e.g., on/off) valve 190 located on an end of fuel conduit 192 proximate to the fuel manifold 164. Fuel conduit 192 may be in fluid communication with the fuel manifold 164. Flow control valve 190 may be configured to control the flow of fluid 210 (e.g., fuel) into fuel conduit 192. For example, when flow control valve 190 is in an "open" position as shown in FIGS. 5B, 5C, 5D, and 5E, fluid 210 may enter (i.e., flow into) fuel conduit 192. When flow control valve 190 is in a "closed" position, as shown in FIG. 5A, fluid 110 may be prevented from entering (i.e., flowing into) fuel conduit 192. Fluid 210 may flow through fuel conduit 192 in a direction generally away from the fuel manifold 164 (i.e., in the direction of arrow 196).

Fuel nozzles 200a, 200b, 200c, and 200d may be off-set from fuel conduit 192. In various embodiments, fuel nozzles 200a, 200b, 200c, and 200d may be off-set axially from fuel conduit 192. In various embodiments, fuel nozzles 200a, 200b, 200c, and 200d may be off-set circumferentially from fuel conduit 192. A plurality of connecting conduits 208 may be employed to fluidly couple fuel nozzles 200a, 200b, 200c, and 200d to fuel conduit 192. Connecting conduits 208 may be generally orthogonal to fuel conduit 192 and/or generally orthogonal to the direction of fluid flow (as indicated by arrow 196) through fuel conduit 192. As used herein, "generally orthogonal" means±20 degrees from orthogonal.

Spraybar 162 may further comprise one or more pressure valves (e.g., pressure valves 202, 204, and 206). Pressure valves 202, 204, and 206 may be fluidly coupled to fuel conduit 192. In various embodiments, connecting conduits 208 may fluidly couple fuel conduit 192 to pressure valves 202, 204, and 206, and pressure valves 202, 204, and 206 to fuel nozzles 200a, 200c, and 200d, respectively. Pressure valves 202, 204, and 206 may be configured to control the flow of fluid 210 through connecting conduits 208. In this regard, Pressure valves 202, 204, and 206 may regulate the flow of fluid 210 to fuel nozzles 200a, 200c, and 200d, respectively. For example, in various embodiments, pressure valve 202 may be located upstream of fuel nozzles 200a, pressure valve 204 may located upstream of fuel nozzles 200c, and pressure valve 206 may located upstream of fuel nozzles 200d.

In various embodiments, pressure valves 202, 204, and 206 may comprise in-line biased pressure valves, similar to in-line biased pressure valve 302 in FIGS. 6A and 6B. In this regard, pressure valves 202, 204, and 206 may comprise biasing members that apply a force in a direction generally parallel to the direction fluid 210 flows through connecting conduits 208. As used herein, "generally parallel" means between ±20 degrees of parallel. Stated differently, pressure valves 202, 204, and 206 may comprise in-line biased pressure valves having biasing members that apply a force in a direction generally orthogonal to the direction fluid 210 flows through fuel conduit 192.

In various embodiments, pressure valves 202, 204, and 206 may comprise orthogonally biased pressure valves, similar to orthogonally biased pressure valve 402 in FIGS. 7A and 7B. In this regard, pressure valves 202, 204, and 206 may comprise biasing members that apply a force in a direction generally orthogonal to the flow of fluid 210 through connecting conduits 208. Stated differently, pressure valves 202, 204, and 206 may comprise orthogonally biased pressure valves having biasing members that apply a force in a direction generally parallel to the direction fluid 210 flows through fuel conduit 192. In various embodiments, pressure valves 202, 204, and 206 may comprise a combination of in-line biased pressure valves and orthogonally biased pressure valves.

In various embodiments, pressure valve 204 may be positioned radially outward of pressure valve 202. In various embodiments, pressure valve 204 may be positioned a greater radial distance from fuel manifold 164 as compared to pressure valve 202. In various embodiments, pressure valve 206 may be positioned radially outward of pressure valves 202 and 204. In various embodiments, pressure valve 206 may be positioned a greater radial distance from fuel manifold 164 as compared to pressure valves 202 and 204.

In various embodiments, pressure valves 202, 204, and 206 and may be configured to open at a different pressures, thereby forming fuel injection zones along spraybar 162. For example, with reference to FIG. 5B, upon opening flow control valve 190, fluid 210 may flow through fuel conduit 192. As fluid 210 flows through fuel conduit 192, a portion of fluid 210 may flow through a connecting conduit 208 and be ejected from fuel nozzles 200b. When flow control valve 190 is initially opened, pressure valves 202, 204, and 206 may be in a closed position and may prevent fluid 210 from flowing to fuel nozzles 200a, 200c, and 200d, respectively. Stated differently, while a pressure exerted by fluid 210 remains below the threshold pressures associated with opening pressure valves 202, 204, and 206, fluid 210 is prevented (i.e., blocked) from flowing to fuel nozzles 200a, 200c, and 200d.

Figure 5C:
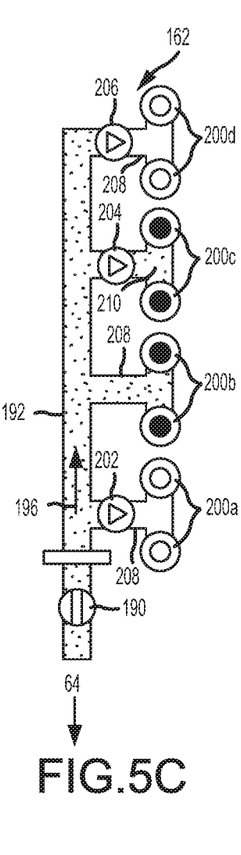

With reference to FIG. 5C, as a volume and/or flowrate of fluid 210 within fuel conduit 192 and in the portions of connecting conduit 208 upstream of pressure valves 202, 204, and 206 increases, the pressure exerted by fluid 210 against pressure valves 202, 204, and 206 may increase. In this regard, when the pressure exerted by fluid 210 exceeds a threshold pressure associated with opening pressure valve 204, pressure valve 204 may translate to an open position. Upon pressure valve 204 opening, fluid 210 may flow to fuel nozzles 200c. In various embodiments, the threshold pressure associated with opening pressure valve 204 may be less than the threshold pressure associated with opening pressure valves 202 and 206. In this regard, when pressure valve 204 opens, pressure valves 202 and 206 may remain in a closed position and prevent fluid 210 from flowing to fuel nozzles 200a and 200d.

Figure 5D:
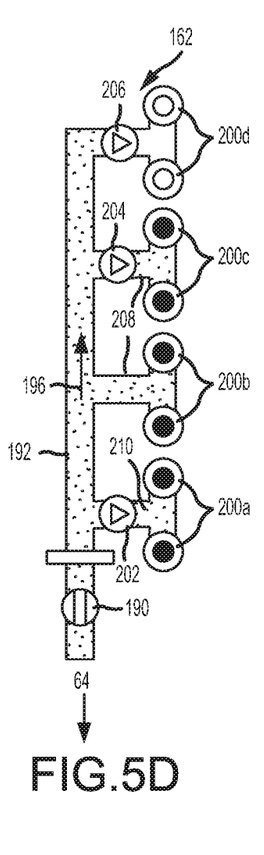

With reference to FIG. 5D, as a volume and/or flowrate of fluid 210 within fuel conduit 192 and in the portions of connecting conduit 208 upstream of pressure valves 202 and 206 increases, the pressure exerted by fluid 210 against pressure valves 202 and 206 increases. In this regard, when the pressure exerted by fluid 210 exceeds the pressure threshold associated with opening pressure valve 202, pressure valve 202 translates to an open position. Upon pressure valve 202 opening, fluid 210 may flow to fuel nozzles 200a. In various embodiments, the threshold pressure associated with opening pressure valve 202 may be less than the threshold pressure associated with opening pressure valve 206. In this regard, when pressure valve 202 opens, pressure valve 206 may remain in a closed position and prevent fluid 210 from flowing to fuel nozzles 200d.

Figure 5E:
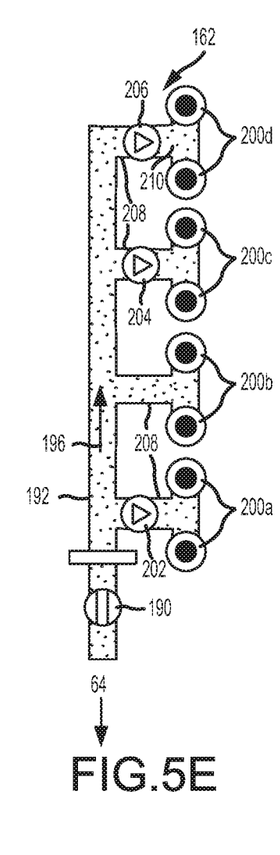

With reference to FIG. 5E, as a volume and/or flowrate of fluid 210 in fuel conduit 192 and in the portion of connecting conduit 208 upstream of pressure valve 206 increases, the pressure exerted by fluid 210 against pressure valve 206 may increase. In this regard, when the pressure exerted by fluid 210 exceeds the pressure threshold associated with opening pressure valve 206, pressure valve 206 may translate to an open position.

In various embodiments, the load (i.e., pressure) associated with opening pressure valve 202 may be greater than the load (i.e., pressure) associated with opening pressure valve 204. In various embodiments, the load (i.e., pressure) associated with opening pressure valve 206 may be greater than the load (i.e., pressure) associated with opening pressure valve 202 and 204. In this regard, pressure valves 202, 204, and 206 may be employed to form multiple fuel injection zones along spraybar 162. In various embodiments, one or more of the pressure valves 202, 204, and 206 may be configured to open at the same pressure. For example, in various embodiments, the pressure associated with opening pressure valve 202 may be less than the pressure associated with opening pressure valve 204 and may be equal to the pressure associated with opening pressure valve 206, thereby allowing the radially outer and radially inner zones to spray fluid 210 prior to the mid zone located therebetween. While three pressure valves are illustrated, it should be appreciated that spraybar 162 may include any number of pressure valves configured to opening in any order. Spraybars 162 comprising off-set pressure valves and fuel nozzles may allow multiple fuel injection zones to be formed along a single fuel conduit. Employing a single fuel conduit with multiple fuel injection zones tends to improve packaging and decrease a weight of the system, as compared to augmentor fuel injection system employing multiple conduits to generate fuel zoning.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A spraybar for an augmentor section of a gas turbine engine, comprising:
    a fuel conduit disposed within the spraybar and extending radially into the augmentor section of the gas turbine engine;
    a flow control valve configured to control a flow of fluid into the fuel conduit;
    a plurality of fuel nozzles located in series along a length of the fuel conduit; and
    a plurality of pressure valves located in series along the length of the fuel conduit,
    wherein a first fuel nozzle of the plurality of fuel nozzles is downstream of the flow control valve and upstream of a first pressure valve of the plurality of pressure valves, and wherein a second fuel nozzle of the plurality of fuel nozzles is downstream of the first pressure valve and upstream of a second pressure valve of the plurality of pressure valves, wherein the first pressure valve is opened in response to a first pressure in the fuel conduit and the second pressure valve is opened in response to a second pressure in the fuel conduit.

2. The spraybar of claim 1, wherein the first pressure valve comprises:
    a valve cap; and
    a spring configured to exert a force on the valve cap.

3. The spraybar of claim 2, wherein the first pressure valve is an in-line biased pressure valve.

4. The spraybar of claim 2, wherein the first pressure valve is an orthogonally biased pressure valve.

5. The spraybar of claim 1, wherein the second pressure associated with opening the second pressure valve is greater than the first pressure associated with opening the first pressure valve.

6. The spraybar of claim 1, further comprising:
    a first connecting conduit fluidly coupling the first fuel nozzle and the fuel conduit; and
    a second connecting conduit fluidly coupling the second fuel nozzle and the fuel conduit.

7. The spraybar of claim 6, wherein the second pressure associated with opening the second pressure valve is less than the first pressure associated with opening the first pressure valve.

8. A gas turbine engine, comprising:
    a turbine;
    an augmentor section aft of the turbine, the augmentor section comprising an augmentor vane; and
    a spraybar located proximate an aft end of the augmentor vane and extending radially into the augmentor section, the spraybar comprising:
        a fuel conduit disposed within the spraybar,
        a flow control valve configured to control a flow of fluid into the fuel conduit;
        a plurality of fuel nozzles located in series along a length of the fuel conduit; and
        a plurality of pressure valves located in series along the length of the fuel conduit,
    wherein a first fuel nozzle of the plurality of fuel nozzles is downstream of the flow control valve and upstream of a first pressure valve of the plurality of pressure valves, and wherein a second fuel nozzle of the plurality of fuel nozzles is downstream of the first pressure valve and upstream of a second pressure valve of the plurality of pressure valves wherein the first pressure valve is opened in response to a first pressure in the fuel conduit and the second pressure valve is opened in response to a second pressure in the fuel conduit.

9. The gas turbine engine of claim 8, wherein the first pressure valve comprises:
    a valve cap; and
    a spring configured to exert a force on the valve cap.

10. The gas turbine engine of claim 9, wherein the first pressure valve is an in-line biased pressure valve.

11. The gas turbine engine of claim 9, wherein the first pressure valve is an orthogonally biased pressure valve.

12. The gas turbine engine of claim 8, wherein the second pressure associated with opening the second pressure valve is different from the first pressure associated with opening the first pressure valve.

13. The gas turbine engine of claim 8, wherein the second pressure associated with opening the second pressure valve is less than the first pressure associated with opening the first pressure valve.

14. An augmentor fuel injection system, comprising:
a fuel manifold;
a fuel conduit extending radially from the fuel manifold and into an augmentor section of a gas turbine engine;
a plurality of fuel nozzles located in series along a length of the fuel conduit; and
a plurality of pressure valves located in series along the length of the fuel conduit,
wherein a first pressure valve of the plurality of pressure valves controls a flow of fluid to a first fuel nozzle of the plurality of fuel nozzles, and wherein a second pressure valve of the plurality of pressure valves controls the flow of fluid to a second fuel nozzle of the plurality of fuel nozzles, wherein the first pressure valve is opened in response to a first pressure in the fuel conduit and the second pressure valve is opened in response to a second pressure in the fuel conduit.

15. The augmentor fuel injection system of claim 14, further comprising a flow control valve upstream of the first pressure valve on an end of the fuel conduit proximate the fuel manifold, wherein the flow control valve is configured to regulate the flow of fluid to the fuel conduit.

16. The augmentor fuel injection system of claim 14, wherein the first pressure valve comprises:
a valve cap; and
a spring configured to exert a force on the valve cap.

17. The augmentor fuel injection system of claim 16, wherein the first pressure valve is at least one of an in-line biased pressure valve or an orthogonally biased pressure valve.

18. The augmentor fuel injection system of claim 14, wherein the second pressure valve is a greater distance radially from the fuel manifold than the first pressure valve.

19. The augmentor fuel injection system of claim 18, wherein the second pressure associated with opening the second pressure valve is greater than the first pressure associated with opening the first pressure valve.

20. The augmentor fuel injection system of claim 18, further comprising:
a first connecting conduit fluidly coupling the first fuel nozzle and the fuel conduit; and
a second connecting conduit fluidly coupling the second fuel nozzle and the fuel conduit,
wherein the second pressure associated with opening the second pressure valve is less than the first pressure associated with opening the first pressure valve.

* * * * *

UNITED STATES PATENT AND TRADEMARK OFFICE
CERTIFICATE OF CORRECTION

PATENT NO. : 10,801,412 B2  
APPLICATION NO. : 15/851374  
DATED : October 13, 2020  
INVENTOR(S) : Nicholas W. Kantany et al.

Page 1 of 1

It is certified that error appears in the above-identified patent and that said Letters Patent is hereby corrected as shown below:

On the Title Page

Item (54) and in the Specification Column 1 Line 1 at the end of the Title after PRESSURE ZONE SPRAYBARS, please insert -- FOR AN AUGMENTOR SECTION OF A GAS TURBINE ENGINE --

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*